US010507532B2

(12) United States Patent
Wielandts

(10) Patent No.: US 10,507,532 B2
(45) Date of Patent: Dec. 17, 2019

(54) CHUCK FOR A HIGH PRECISION MACHINE TOOL

(71) Applicants: WIELANDTS UPMT, Nandrin (BE); WSL, Liège (BE)

(72) Inventor: Marc Wielandts, Nandrin (BE)

(73) Assignees: WIELANDTS UPMT, Nandrin (BE); WSL, Liege (BE)

( * ) Notice: Subject to any disclaimer, the term of this patent is extended or adjusted under 35 U.S.C. 154(b) by 0 days.

(21) Appl. No.: 15/756,015

(22) PCT Filed: Sep. 2, 2015

(86) PCT No.: PCT/EP2015/070034
§ 371 (c)(1),
(2) Date: Feb. 27, 2018

(87) PCT Pub. No.: WO2017/036523
PCT Pub. Date: Mar. 9, 2017

(65) Prior Publication Data
US 2018/0243839 A1    Aug. 30, 2018

(51) Int. Cl.
*B23B 31/36*    (2006.01)
*B23B 31/28*    (2006.01)
(Continued)

(52) U.S. Cl.
CPC .............. *B23B 31/36* (2013.01); *B23B 31/28* (2013.01); *B23B 31/307* (2013.01);
(Continued)

(58) Field of Classification Search
CPC ....... B23B 31/28; B23B 31/307; B23B 31/36; B23B 2250/04; B24B 41/061; Y10T 279/14; Y10T 279/25
See application file for complete search history.

(56) References Cited

U.S. PATENT DOCUMENTS 1,687,143 A  * 10/1928  Richard ................. B23B 31/36
                                                        279/6
1,817,721 A  *  8/1931  Hamersveld ........... B23B 31/36
                                                        279/110
(Continued)

FOREIGN PATENT DOCUMENTS

CN        103353627 A    10/2013
DE        195 31 104 A1   2/1997
(Continued)

OTHER PUBLICATIONS

International Search Report and Written Opinion from the International Searching Authority dated May 3, 2016, for International Application No. PCT/EP2015/070034, filed Sep. 2, 2015, 10 pages.

*Primary Examiner* — Eric A. Gates
(74) *Attorney, Agent, or Firm* — Christensen O'Connor Johnson and Kindness, PLLC

(57) ABSTRACT

A chuck for a machine tool having a rotation spindle with a main axis of rotation. The chuck comprises a base plate, a first rotatable plate eccentrically mounted on the base plate, a second rotatable plate eccentrically mounted on the first rotatable plate, balancing means for aligning a principal axis of inertia of the chuck with the main axis of rotation and a holding mechanism. The chuck is provided with an actuating mechanism for angularly displacing the first rotatable plate around a first rotation axis over a first angle of rotation and/or the second rotatable plate around a second rotation axis over a second angle of rotation such that the position of the object with respect to the main axis of rotation can be altered.

17 Claims, 4 Drawing Sheets

(51) Int. Cl.
  *B23B 31/30* (2006.01)
  *B24B 41/06* (2012.01)
  *B24B 19/02* (2006.01)
(52) U.S. Cl.
  CPC ........ *B24B 41/061* (2013.01); *B23B 2250/04* (2013.01); *B24B 19/02* (2013.01); *B24B 41/068* (2013.01); *Y10T 29/49998* (2015.01); *Y10T 279/11* (2015.01); *Y10T 279/14* (2015.01); *Y10T 279/23* (2015.01)

(56) References Cited

U.S. PATENT DOCUMENTS

| | | | | |
|---|---|---|---|---|
| 2,429,685 | A | * | 10/1947 | Healy ................ B24B 5/421 279/6 |
| 2,952,467 | A | * | 9/1960 | Van Der Velden ..... B23B 31/00 279/114 |
| 3,685,845 | A | | 8/1972 | Fischer et al. |
| 5,135,242 | A | | 8/1992 | Toth |
| 5,180,174 | A | * | 1/1993 | Province ................ B28B 1/02 279/133 |
| 6,159,242 | A | * | 12/2000 | Yamasita ................ A61F 2/16 623/6.46 |
| 7,434,299 | B1 | | 10/2008 | Gill et al. |
| 7,861,624 | B2 | * | 1/2011 | Kunimatsu ............ B23B 1/00 82/1.11 |
| 2002/0000679 | A1 | * | 1/2002 | Fallini ................ B29C 45/26 264/1.1 |
| 2004/0113376 | A1 | | 6/2004 | Meissner et al. |

FOREIGN PATENT DOCUMENTS

| | | |
|---|---|---|
| DE | 20 2013 101345 U1 | 7/2013 |
| DE | 10 2013 220400 A1 | 4/2015 |
| JP | 358335 Z2 | 3/1947 |

* cited by examiner

CHUCK FOR A HIGH PRECISION MACHINE TOOL

TECHNICAL FIELD

The present invention relates to a chuck for a machine tool arranged for positioning an object at a relevant position with respect to a main axis of rotation. More specifically the present invention relates to a positioning or indexing device suitable to be mounted on a spindle of a machine tool. The invention also relates to a machine tool such as a lathe, and in particular to ultra-precision machine tools dedicated to turning and grinding finishing operations of lenslet arrays, wafer optics, multi-cavity dies and moulds for the replication of optical lenses. The invention also relates to the methods for positioning or indexing an object, such as a workpiece, and for machining a multi-cavity die or mould.

BACKGROUND ART

Diamond turning has been traditionally used for the production of monolithic lens arrays, which are used in a variety of applications where lens-to-lens registration is of critical importance. The diamond turning process requires that the substrate, where the monolithic lens arrays are to be produced, is shifted to a new position before the next lens is machined, thereby requiring the operator to shift and align the substrate, then rebalance the work spindle for each lens position. As a result, the use of on axis diamond turning is commonly considered to be unsuitable for the production of large monolithic lens arrays due to the increase in production time required and difficulty in achieving lens-to-lens registration accuracy. In order to reduce the production time required, freeform techniques can be used for the production of monolithic lens arrays.

Gregg et. al. in "*Comparison of Freeform Manufacturing Techniques in the Production of Monolithic Lens Arrays*" provides a comparison of different freeform manufacturing processes that can be used in the production of monolithic lens arrays, which are discussed in more details below. Freeform diamond machining allows lens arrays to be produced in a single setup. Since there are no intermediate shifts of the substrate, the lens-to-lens registration is inherent to the program and machine accuracy. These freeform machining technologies are generally known as Slow Tool Servo (STS), Fast Tool Servo (FTS) and Diamond Micro Milling (DMM). However, the freeform machining technologies listed above have limitations with regards to the surface form accuracy, surface geometry, and production time required.

Diamond Micro-Milling is an effective method used in precision machining of small features on the surface of a work-piece using a spherical diamond tool. Micro-milling allows versatile freeform machining and has the advantage that the work-piece is not rotating. However the accuracy of the micro-milling process can be affected by certain factors relating to the spindle, machine kinematics errors, the misalignment of the tool shaft on the spindle axis, the waviness of the diamond ball end of the cutting tool and cutting tool vibrations caused by the interrupted cutting conditions. Even if the systematic errors caused by the factors mentioned previously are corrected using a correction cycle, the surface quality of a micro-milled surface is generally lower than the surface quality of a diamond turned surface. Another drawback of the diamond micro-milling process is the significantly longer times required for machining small features on the surface of the work-piece. Therefore, the machining on the surface of the work-piece of an array of a thousand lenslets can take up to several days of continuous machining.

Slow Slide Servo, also called Slow Tool Servo, and Fast Tool Servo use multiple axis synchronization, whereby the work-spindle is used as an axis, on a lathe to machine freeform surfaces. However, these methods do not allow the machining of steep slopes because of the limited clearance of diamond tools, are limited in speed by the machine kinematics and generate important surface error due to discontinuities in the toolpath.

Another aspect in the precision machining of small features on an object, such as lens arrays on a monolithic work-piece, is the ability of precisely positioning the object with respect to a tool, such as a cutting tool. Work-piece indexing is a known method used for locating a specific position of the work-piece with respect to a tool, such a cutting tool, for performing precision machining operations. Automatic positioning and indexing of a tool or work-piece is known from the prior art for many operations as for milling, drilling, laser machining, inspection, metrology, etc. These systems generally integrate guideways, actuators e.g. motor and position measurement instruments while the control system can be integrated or external. However, the automatic indexing or positioning devices of the prior art do not integrate balancing means for balancing the work-piece on a rotating spindle each time a new position is reached. As a result, the positioning and indexing solutions of the prior art are not suitable to be mounted onto a rotating precision work-spindle that needs to be accurately balanced on the rotating axis of the work-spindle. The automatic positioning and indexing solutions of the prior art are further not suitable to maintain precisely and firmly the tool or work-piece in its off-axis positions while the spindle is rotating at relatively high speeds, typically between 300 and 2000 rotations per minute (RPM), for example 300 to 1000 RPM.

DISCLOSURE OF THE INVENTION

It is an aim of the present invention to provide a device for a machine tool, such as a chuck, arranged for automatically positioning or indexing an object with respect to the main axis of rotation of a spindle, for example on the rotor of a rotation spindle, without requiring rebalancing of the device after each displacement of the object with respect to the main axis of rotation of the spindle. This device may be particularly useful in combination with ultra-high precision machining methods such as single point diamond turning and grinding to machine monolithic lens arrays.

This aim is achieved according to the invention with a chuck showing the technical characteristics of the first claim.

More specifically, according to embodiments of the present invention a chuck is provided for a machine tool having a rotation spindle with a main axis of rotation, in particular a lathe. The chuck is arranged for positioning an object, such as a work-piece, at a relevant position with respect to the main axis of rotation. The chuck with the object positioned on it has principal axes of inertia. The chuck is arranged such that one principal axis of inertia can be arranged to substantially coincide, or even coincide, with the main axis of rotation of the work-spindle irrespective of the position, for example off-axis position, of the object mounted on the chuck. According to embodiments, the chuck is provided with a base plate comprising mounting means for mounting the chuck to the work-spindle. According to embodiments, a first rotatable plate is eccentrically mounted on the base plate with respect to the main axis of rotation and has a first rotation axis positioned in parallel to the main axis of rotation such that the first rotational axis is shifted with respect to the main rotational axis of the work-spindle. Balancing means are provided in order to align the principal axis of inertia of the chuck with the object positioned on it so that this principal axis of inertia substantially coincides, or even coincides, with the main axis of rotation of the spindle. The chuck is provided with a holding mechanism arranged for securing the first rotatable plate to the base plate. In order to change the position of the object with respect to the main axis of rotation an actuating mechanism is provided, which is arranged for angularly displacing the first rotatable plate around the first rotation axis over a first angle of rotation. According to embodiments of the present invention, the chuck comprises a second rotatable plate arranged for receiving the object. The second rotatable plate is eccentrically mounted on the first rotatable plate with respect to the first rotational axis and is secured on the first plate by means of the holding mechanism. The actuating mechanism is arranged for angularly displacing the second rotatable plate around the second rotation axis over a second angle of rotation such that the position of the object with respect to the main axis of rotation can be altered, whereby the second rotation axis runs in parallel to the main axis of rotation and the first axis of rotation such that the second rotation axis is shifted with respect to the first rotation axis.

By providing such first and second eccentrically positioned rotatable plates that can be angularly displaced around their respective rotation axis, the position of the object with respect to the main axis of rotation can be precisely altered without the need for rebalancing the chuck on the main axis of rotation after the object is shifted to a new position as it has been found that such configuration allows to keep the principal axis of inertia of the chuck and the object positioned on it along the main axis of rotation, even when the position of the object with respect to the main axis of rotation has been altered by rotating the first and/or the second disk. This is achieved by using the balancing means arranged for balancing the chuck together with the object on the main axis of rotation. By providing the balancing means, it may be further ensured that each plate of the chuck is balanced on its respective axis, thereby allowing for the centre of mass of the chuck in combination with the object to be balanced on the main axis of rotation for all relevant positions of the object and allowing that the principal axis of rotation of the chuck in combination with the object is substantially aligned, or even aligned, with the main axis of rotation. As a result, the balance of the chuck is not affected by the angular displacement of the first and/or second rotatable plate because if the principal axis of inertia of each rotatable plate is aligned with its rotation axis, its centre of mass does not move when the plate is rotated to any chosen angle, thereby allowing for the objects to be moved at different positions without the need for rebalancing the chuck on the main rotation axis each time the object is moved to a new position. Therefore, the chuck according to embodiments of the present invention allows for dynamic precise positioning or indexing of an object, such as a work-piece, with respect to the main axis of rotation without the need for rebalancing the chuck after each displacement of the object with respect to the main axis. As a result, the positioning of the object, in a plane perpendicular to the spindle rotation axis, can be dynamically controlled with micrometer accuracy so that e.g. surfaces or features such as lenslet arrays can be machined on-axis with micrometer lens-to-lens position accuracy. As a result, with the system of the present invention, the time required for producing monolithic lens arrays on a substrate may be significantly decreased while ensuring high machining accuracies. Moreover, by indexing the work-piece, each lens surface is shifted consecutively onto the spindle axis between cuts. As a result, with the use of the present invention, precision turning and grinding operations can be performed in optimum on-axis cutting conditions while ensuring that all on-axis machinable surface geometries can be generated e.g. steep edge slopes, aspheres, freeforms, Fresnel, diffractive structures, etc. The device may be equipped with high precision actuators and measurement devices to guarantee micron precision lens to lens positions while the positioning or indexing may be performed dynamically without stopping or decelerating the work spindle to guarantee the thermal stability of the workspindle and to optimise the machining times by minimisation of the positioning times.

According to embodiments of the present invention, in at least one position of the object the second rotating axis coincides with the main axis of rotation. For example, when for at least one angle of rotation of the first rotatable plate the second rotation axis is arranged for substantially coinciding, or even coinciding, with the main axis of rotation, for example by mounting the first and the second plate such that the first rotatable plate can be rotated into a position wherein the second axis of rotation coincides with the main axis of rotation. Such a configuration allows to align the second axis of rotation with the main axis of rotation such that any point on the object can be aligned with the main axis of rotation, including its own centre point.

According to embodiments of the present invention, the holding mechanism is arranged for generating a holding force. In this way, the first and second rotatable plates may be secured in the desired position, so as to enable the positioning of the object with respect to the main axis, for example while the chuck is mounted to a rotating spindle. For example, the holding mechanism may comprise a permanent or electro-magnet arrangement, which may be positioned at various locations on the chuck so as to secure the first and second rotatable plates in the desired location. The holding mechanism may also, instead of the magnet arrangement or in addition to it, comprise a pneumatic arrangement, for example for creating a vacuum arranged for generating a suction force for securing the first and second rotatable plates on the desired position or for generating a lifting force lifting the disks with respect to each other. The pneumatic arrangement can for example comprise a pump, which can be provided on the chuck but can also be provided outside of the chuck, for example as part of a machine tool comprising the chuck. It is submitted that the holding mechanism may be realised using other elements known to the person in the art that are suitable for generating a holding force according to embodiments of the present invention.

According to embodiments of the present invention, the holding mechanism comprises a axial movement mechanism, such as for example a flexure spring, which allows movement of, for example the first and the second rotation plate along their respective rotation axes so that the rotation plates can be moved in and out of engagement with each other or with the base plate so that, for example, the rotation plates can be rotated around their respective rotation axes out of engagement with each other or the base plate.

According to embodiments of the present invention, the disks are mounted to their respective rotation axes with any one or more of a roller bearing, an air bearing, a hydrostatic bearing, etc.

According to embodiments of the present invention, the balancing means may comprise a counterweight arrangement. The counterweight arrangement may be adjustable, such that the centre of gravity of the chuck can be balanced on the main axis of rotation for objects having different masses or mass distributions. As a result, the chuck can be used with interchangeable objects having different mass distributions without changing the configuration of the rotatable plates in order to align the principal axis of inertia of the chuck and the object with the main axis of rotation. It is submitted that for example the balancing of the chuck is performed together with the object and prior to the machining operation taking place. As a result, as discussed earlier, the chuck does not need to be rebalanced every time the object is shifted to a new position, which is in contrast to the solutions of the prior art. According to embodiments of the present invention, the counterweight arrangement is adjustable. For example, the counterweight arrangement may be adjusted by changing the mass of the counterweight so as to achieve the desired balancing of the chuck together with the object and/or by changing the configuration of the counterweight with respect to the main axis of rotation, for example by adapting the mass of the counterweight arrangement, by adapting the position of the mass along a direction parallel to the main axis of rotation, also called the height direction, and/or by adapting the position of the mass along a direction perpendicular to the main axis of rotation, also called the radial direction. By adjusting the height of the mass of the counterweight the tilting moment resulting from the centrifugal forces during the main axis rotation may be compensated by aligning the principal axis of inertia of the chuck in combination with the object, for example a work-piece, to coincide with the main axis of rotation. The counterweight arrangement may comprise weights made from a solid material such as metal or the like as counterweight of the counterweight arrangement. Furthermore, the counterweight arrangement may comprise fluids, such as liquids having a predetermined viscosity, as the counterweight of the counterweight arrangement.

According to embodiments of the present invention, the counterweight arrangement may comprise several counterweight parts, such as a first and a second part. For example, the first part may be positioned at a predetermined location on the base plate, while the second part may be positioned on a predetermined location with respect to the location of the first part on the first rotatable plate. The counterweight arrangement may also comprise a third part, which may be positioned on the second rotatable plate so as to further compensate for the weight of the object, for example in case the object does not intrinsically have its own principal axis of inertia aligned with the second rotation axis. By providing a counterweight arrangement according to the embodiments of the present invention, it may be further ensured that each plate of the chuck is balanced on its respective axis, thereby allowing for the centre of mass of the chuck in combination with the object to be balanced on the main axis of rotation for all relevant positions of the object and allowing that the principal axis of inertia of the chuck in combination with the object is substantially aligned, or even aligned, with the main axis of rotation. As a result, the balance of the chuck is not affected with the angular displacement of the first and/or second rotatable plate, thereby allowing for the objects to be moved at different positions without the need for rebalancing the chuck on the main rotation axis each time the object is moved to a new position.

According to embodiments of the present invention, the chuck comprises object mounting means for securing the object on the second plate. The object mounting means for example comprise any one or more of mechanical attachments, for example bolts, using air pressure sucking the object onto the second plate, an adhesive, etc.

According to preferred embodiments of the present invention, by providing a lifting force between the first and second rotatable plates, for example lifting the second plate off the first plate, the angle of the first and/or second rotatable plate around their respective rotation axis may be altered more easily because of the reduced friction between the rotatable plates' rotor and stator due to a reduced, or even lack of, contact between the plates.

According to preferred embodiments of the present invention, the angular displacement of the first and/or second rotatable plate can be performed without having to suspend the operation of the machine tool, thereby significantly reducing the down time of the machine tool during the positioning of the object with respect to the main axis. Furthermore, by angularly displacing the first and/or second rotatable plate without having to suspend the machine tool operation, it is ensured that the rotation of the spindle is maintained during the positioning of the object at constant speed, thereby ensuring that the spindle operates in a stable thermal regime so as to minimise the thermal spindle effects on the machining process, which may affect the precision of the machining process.

According to embodiments of the present invention the chuck comprises a pneumatic arrangement. The pneumatic arrangement may be arranged for generating a suction force so as to secure the object on the second rotatable plate, in other words counteracting a lifting force as described above, and thus in such embodiment would be part of the object mounting means. The pneumatic arrangement may be arranged for generating a suction force so as to secure the plates to each other and to the base plate and thus in such embodiment would be part of the holding mechanism. The pneumatic arrangement may be also provided for generating the lifting force that exceeds the holding force generated by the holding mechanism. For example, the pneumatic arrangement, for example comprising a pump, is arranged for directing an amount of pressurised air through an air bearing provided on the chuck, e.g, in the first and/or second rotating plate, so as to generate a thin film of pressurised air between the rotatable plates and/or between the first rotatable plate and the base plate, thereby providing an exceedingly low friction load-bearing interface between the rotatable plates and/or between the first rotatable plate and the base plate.

According to embodiments of the present invention, the pneumatic arrangements may be provided with a set of valves for controlling the air flow generated by and/or flowing through the pneumatic arrangement. For example, the valves may be arranged for directing pressurised air through the air bearing provided on the first and second rotating plates, such that a lifting force is generated between the rotatable plates. According to embodiments of the present invention, the set of valves are electronically controlled by means of a controller. For example, the controller may be controlled according to a set of instruction received from a computer device. By controlling the controller by means of a set of instructions, the set of valves, and thereby the lifting force generated by the pump, may be automatically controlled without manual intervention. For example, a computer software program that contains instructions for operating the at least one controller of the chuck may be provided for electronically controlling the set of valves. The computer software program is typically stored in EPROM or EEPROM on the controller but may be stored in any computer program product such as a computer hard disk drive, a USB stick, a CD, or the like.

According to embodiments of the present invention, the actuating means arranged for angularly displacing the first and/or second rotatable plates may be provided with at least one angle sensor or transducer. The angle sensor or transducer may be arranged for monitoring the angular displacement of the first and/or second rotatable plate. The at least one angle sensor or transducer may be of any suitable analog or digital type such as absolute rotary encoder, incremental encoder, resolver and the like.

According to embodiments of the present invention, the actuating mechanism may comprise a motor. For example, the actuating means may comprise a direct drive or geared DC brushless motor or the like arranged for angularly displacing the first and/or second rotatable plate at predetermined angles around the first and/or second rotatable axis. According to embodiments of the present invention, the actuating mechanism comprises a controller arranged for controlling the angular displacement of the first rotatable plate and/or the second rotatable plate. For example, the controller may be arranged for controlling the angular displacement of the first and/or second rotatable plates according to a set of instructions received from a computer device. In this way, the angular displacement of the first and/or second rotatable plate may be automatically controlled by means of a computer software program running on a computer device. The computer software program may be stored in a computer program product such as the computer hard disk drive, a USB stick, a CD, or the like.

According to embodiments of the present invention, the chuck of the machine tool may be arranged for positioning the object at a relevant position with respect to a machine tool counterpart. For example, the chuck may be arranged for positioning the work-piece at a relevant position with respect to a cutting tool, for example a diamond turning tool or a diamond grinding wheel, by positioning the work-piece at a relevant position with respect to the main axis.

According to preferred embodiments of the present invention, the positioning error resulting from any non-Ideality in the rotation of the first rotatable plate and/or second rotatable plate is compensated by means of a lookup table or compensation algorithms.

According to preferred embodiments of the present invention, the work-piece is used in a metrology procedure to measure the positioning error due to the chuck, and to compensate for this positioning error. This procedure for example may include measuring some parameters relating to the chuck, for example relating to the position of components of the chuck, and correspondingly compensating according to the measurements.

According to embodiments of the present invention, the object, such as a work piece, is positioned at a relevant position with respect to the main axis of rotation, for example, for turning or grinding a work piece, for example while the chuck is subject to a rotational movement around the main axis of rotation.

According to embodiments of the present invention, a machine tool may be provided for turning and or grinding a work-piece. For example, the machining tool may be arranged for machining on the surface of the work-piece at least one cavity or an array of cavities, such as mould cavities used for manufacturing lenses. The machine tool may be provided with a chuck according to embodiments of the present invention for positioning the work-piece at a relevant position with respect to the main axis of rotation.

According to embodiments of the present invention, a work-piece may be created by a machine tool according to embodiments of the present invention. For example, the work-piece may comprise at least one cavity or an array of cavities, such as mould cavities used for manufacturing lenses.

According to embodiments of the present invention, a replication piece may be created from a work-piece manufactured from a machining tool having a chuck according to embodiments of the present invention.

According to embodiments of the present invention, at least one lens may be manufactured from at least a mould cavity, which mould cavity may be provided on a work-piece or a replication piece according to embodiments of the present invention. According to embodiments of the present invention, the lens may be mounted in a lens arrangement, which lens arrangement may be mounted in a camera, a phone, a telescope, or other device using a lens arrangement.

The invention also relates to the use of a machine tool comprising a chuck according to the invention for turning or grinding a work piece. According to further embodiments, in a further step at least one cavity, for example a mould cavity, for example a lens mould, is formed on the surface of the work piece. According to further embodiments, in a further step at least one array of cavities, for example a mould cavity, for example a lens mould cavity is formed on the surface of the work piece. According to embodiments of the present invention, in a further step a replication piece is created from the work piece. According to embodiments of the present invention, in a further step at least one lens is created. According to embodiments of the present invention, in a further step the lens is mounted in a lens arrangement. According to embodiments of the present invention, the lens arrangement is mounted in a camera, a phone, a telescope, or other device using a lens arrangement.

BRIEF DESCRIPTION OF THE DRAWINGS

The invention will be further elucidated by means of the following description and the appended figures.

MODES FOR CARRYING OUT THE INVENTION

Figure 1:
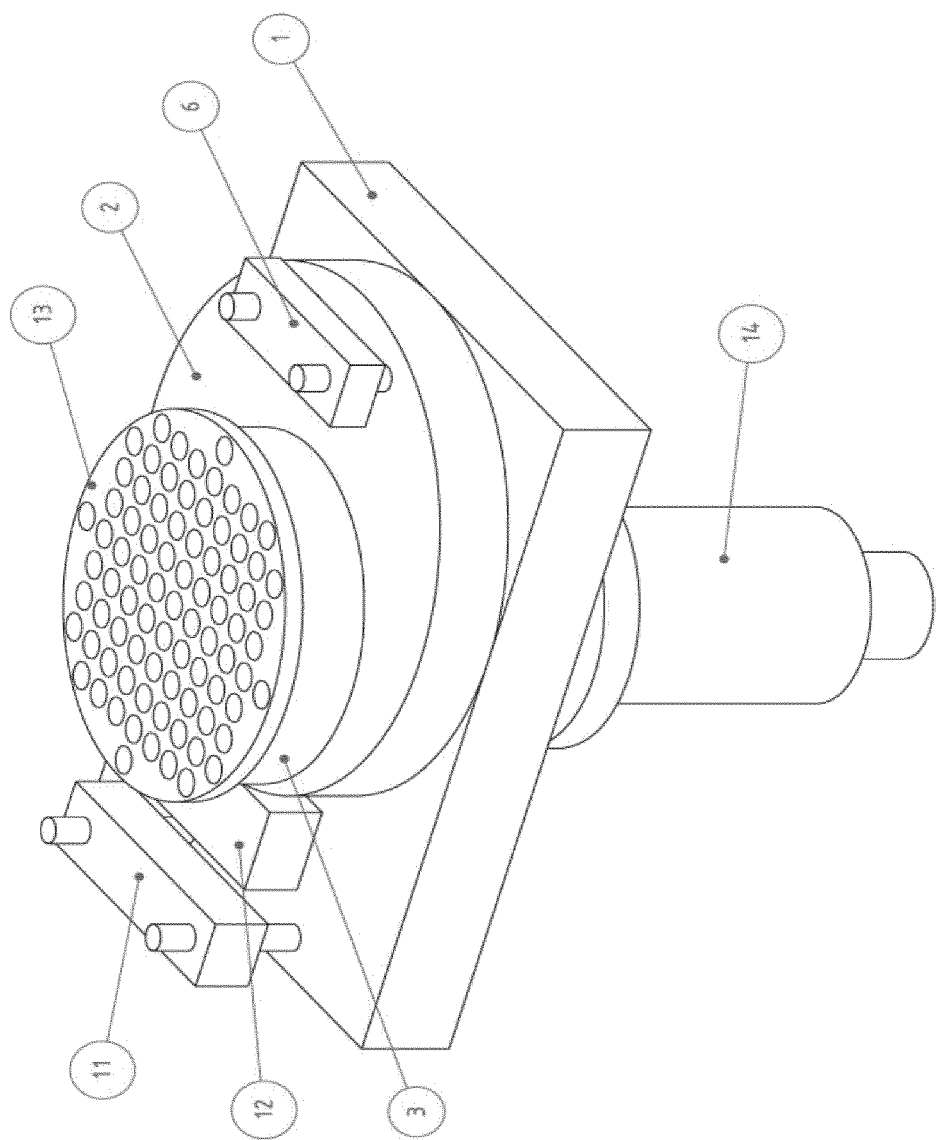
FIG. 1 shows schematically an example of a chuck according to embodiments of the present invention mounted on a spindle.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

Furthermore, the various embodiments, although referred to as "preferred" are to be construed as exemplary manners in which the disclosure may be implemented rather than as limiting the scope of the disclosure.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present disclosure, the only enumerated components of the device are A and B, and further the claim should be interpreted as including equivalents of those components.

The present invention will be elucidated by means of the example embodiments shown in FIGS. 1 to 4, which will be described in more details below.

Figure 2:
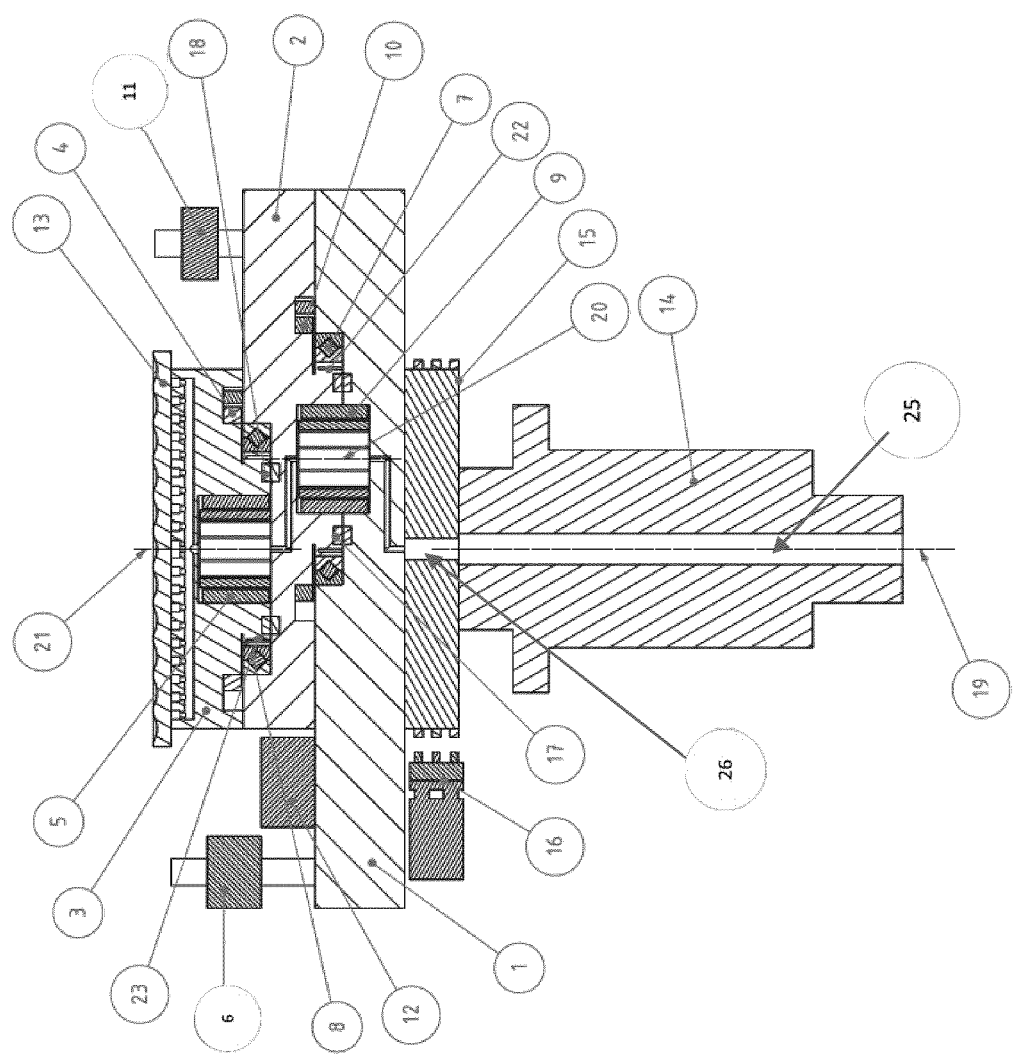
FIG. 2 shows schematically a cross-section of the chuck of FIG. 1.

FIGS. 1 and 2 show an example of a chuck according to the present invention. The chuck may be arranged for being mounted on a machine tool having a spindle 14, such as a work spindle, arranged for rotating about a main axis of rotation 19. The rotation speed of the spindle 14 may be determined according to the application for which the machine tool is used. For example, the rotation speed of the spindle 14 may be in the range between 100 to 1000 RPM. The chuck may be mounted on the spindle 14 by means of a mounting interface plate 15, which may be arranged for being attached to the spindle 14 by attachment means. For example, the mounting interface plate 15 may be fixed to the spindle 14 by a set of screws or by means of a zero point mounting system or alternatively the mounting interface plate 15 may be part of the spindle 14. The chuck may be arranged for positioning an object 13, such as a work-piece, at a relevant position with respect to the main axis of rotation 19. The chuck may be arranged such that one of its principal axes of inertia substantially coincides, or even coincides, with the main axis of rotation 19 of the spindle 14, preferably after positioning the object 13 on the chuck. The chuck may be provided with a base plate 1 arranged for being mounted on the mounting interface plate 15 by mounting means. For example, the mounting means may comprise a set of screws with corresponding bores provided on the mounting interface plate 15 or any other mounting means known to the skilled person in the art suitable for securing the base plate 1 to the mounting interface plate 15 of the spindle 14. On top of the base plate 1, a first rotatable plate 2 may be eccentrically mounted. The first rotatable plate 2 may be arranged for rotating about a first rotation axis 20, which may be shifted with respect to the main axis of rotation 19 of the spindle 14. The first rotatable plate may be secured on the base plate by means of a holding mechanism 17 and 22, more in particular a first part of the holding mechanism 17 called the first holding mechanism. A second rotatable plate 3 may be eccentrically mounted on top of the first rotatable plate 2 by means of holding mechanism 18 and 23, more in particular a second part of the holding mechanism 18 called the second holding mechanism. The second rotatable plate 3 may be arranged for receiving an object 13, such as a work-piece, and for rotating about a second rotation axis 21. The second rotation axis 21 may be arranged to run in parallel to the first rotation axis 20 and being shifted with respect to the first rotation axis 20 of the first rotatable plate 2. The holding mechanism may comprise set of magnets 17 and 18, for example electromagnets, arranged for generating a holding force on relevant locations of the chuck, as shown in FIG. 2. For example, a set of electromagnets 17 may be positioned on opposing surfaces on the first rotatable plate 2 and the base plate 1 so as to secure the first rotatable plate 2 on the base plate 1, and a second set of electro-magnets 18 may be positioned on opposing surfaces on the first rotatable plate 2 and on the second rotatable plate 3 so as to secure the second rotatable plate 3 on the first rotatable plate 2. Furthermore, it should be understood that the holding mechanism 17 and 18 may comprise other means for providing a desired holding force on the relevant location between the plates of the chuck known to the person skilled in the art. For example, the holding mechanism may be realised by means of a vacuum arranged for generating a suction force so as to secure the first and/or second rotatable plates 2 and 3 on the desired position. It is understood that preferably the first and the second disk can be lifted with respect to each other such as to allow a more easy rotation of the disks with respect to each other. Thereto, for example flexure springs 22, 23 are provided which allow the disks to be moved axially.

In order to align a principal axis of inertia of the chuck together with the object 13 with respect to the main axis of rotation 19, balancing means may be provided. By providing the balancing means 6 and 11 the principal axis of inertia of the chuck, preferably after positioning the object 13 onto the chuck may be arranged to substantially coincide, or even coincide, with the main axis of rotation 19 of the spindle 14. As a result, the chuck, by means of the balancing means 6 and 11, remains balanced on the main axis of rotation 19 irrespective of the position of the object. For example, the balancing means 6 and 11 may comprise a counterweight arrangement arranged for compensating a shift in the centre of gravity of the chuck caused by the eccentric arrangement of the first and second rotatable plates 2 and 3. The counterweight arrangement may be provided with a first part 6, which may be positioned at a first location on the base plate 1, and a second part 11, which may be positioned at a second location on the first rotatable plate 2 with respect to the location of the first counterweight part 6. By providing the counterweight arrangement, it is ensured that each plate of the chuck is balanced on each respective axis, thereby ensuring that the chuck remains balanced irrespective of the angular displacement of the first and/or second rotatable plates 2 and 3. The counterweight arrangement may further be provided with a third part, which is not shown, arranged for being positioned at a location on the second rotatable plate 3 so as to counterbalance the weight of the object 13, thereby ensuring that the second rotatable plate 3 is balanced on its axis 21 when the object 13 is positioned on its surface. For example, the counterweight arrangement may be adjustable such that the centre of gravity of the chuck can be aligned with the main axis of rotation 19 for objects 13 having different mass distributions. As a result, the chuck can be used with interchangeable objects 13 having different mass distributions without requiring to change the configuration of the rotatable plates in order to balance the chuck on the main axis of rotation 19. According to embodiments of the present invention, the counterweight arrangement may be adjusted by changing the mass of the counterweight of the counterweight arrangement so as to achieve the desired balancing of the chuck together with the object 13. Moreover, the counterweight of the counterweight arrangement may be adjusted by changing the height of the counterweight of the counterweight arrangement. By adjusting the height of the counterweight, the tilting moment resulting from the centrifugal forces when turning the chuck about the main axis of rotation 19 may be compensated. The counterweight arrangement may comprise weights made from a solid material such as metal or the like as counterweight. The counterweight arrangement may be itself actuated in radial and/or height positions. Furthermore, the counterweight arrangement may comprise fluids, such as liquids having a predetermined viscosity as counterweight.

According to embodiments of the present invention, the mass and height position of the counterweight parts 6 and 11 may be precisely determined during the assembly of the chuck so that the chuck is perfectly balanced with no object or work-piece attached to it. The counterweight parts 6 and 11 may then be adjusted for the mass and geometry of the object or work-piece 13 that is installed onto the second rotatable plate 3. The object or work-piece may be considered to be itself balanced so that the second rotatable plate 3 remains perfectly balanced on the second rotation axis. The required adjustments of the counterweight arrangement may be calculated knowing the exact values of the mass and position of the centre of gravity of the object or work-piece 13 and of the geometry of the system. For example, for frictionless air bearing work-spindles with horizontal axis, the balancing of the system can be verified statically for all angular displacements of the first and/or second rotatable plates around the first rotation axis 20 and the second rotation axis 21. Dynamic balancing using precision field balancing instruments or the analysis of induced vibration on the main axis of rotation 19 of ultra-precision machine tools are state of the art procedures, which may be used to optimise the balancing of the chuck with respect to the operating speed of the work-spindle 14. Using dynamic balancing the residual imbalance may be reduced to as low as 50 g.mm or less. The chuck may be provided with an actuating mechanism arranged for angularly displacing the first rotatable plate 2 around the first rotation axis 20 over a first angle of rotation such that the position of the object 13 with respect to the main axis of rotation 19 can be altered. The actuating means may further be provided for angularly displacing the second rotatable plate 3 around the second rotation axis 21 over a second angle of rotation such that the position of the object 13 with respect to the main axis of rotation 19 can be further altered.

As shown in FIG. 2, the chuck may be provided with a pneumatic arrangement, which may be arranged for cooperating with an air/vacuum channel 25 provided on the spindle 14. A pneumatic connection between the chuck and the air/vacuum channel 25 of the spindle 14 may be formed via the pneumatic connection 26 provided on the mounting interface plate 15. The pneumatic arrangement may be arranged for generating a suction force so as to secure the object and/or any of the rotatable plates of the chuck. The pneumatic arrangement may be further arranged for generating a positive air pressure, such as a lifting force, that may be configured for exceeding the holding force generated by the holding mechanism 17 and 18. For example, by generating a lifting force between the first rotatable plate 2 and the base plate 1, the first rotatable plate 2 may be lifted, at least slightly, on the first rotation axis with respect to the base plate 1, thereby allowing the actuating mechanism to angularly displace the first rotatable plate 2 around the first rotation axis 20 so as to change the position of the object 13 with respect to the main axis of rotation 19. Similarly, the lifting force generated by the pneumatic arrangement may be used for lifting the second rotatable plate 3 on the second rotation axis 21 with respect to the first rotating plate 2 so as to angularly displace the second rotatable plate around the second rotation axis 21, thereby changing the position of the object 13 with respect to the main axis of rotation 19. For example, the pneumatic arrangement may be provided with least one pump, such as a micro venturi pump or the like, which may be arranged for generating a suction force for securing the object 13 on the second rotatable plate 3. The at least one pump may further be arranged for generating a positive air pressure to air bearing provided on the first and/or second rotatable plate 2 and 3. The air pressure generated may be between 1 and 10 bars, preferably between 3 to 7 bars, and more preferably around 5 bars. For example, the pump may be arranged for directing air to the air bearings provided on the first and/or second rotatable plate 2 and 3 a thin film of pressurized air to provide an exceedingly low friction load-bearing interface between the rotatable plates 2 and 3. The pneumatic arrangement may comprise a set of valves, such as micro electrovalves or the like, arranged for controlling the lifting and/or suction force generated by the pneumatic arrangement. In order to control the operation of the set of valves at least one controller 12, which may be electronically controlled, may be provided. The controller 12 may be arranged for controlling the operation of the valves according to a set of instructions received from a computer device. For example, the computer device may be provided with a computer program product, such as a hard disk drive, a USB or the like, arranged for storing instructions for operating the at least one controller 12 of the chuck so as to electronically control the set of valves of the pneumatic arrangement. The controller 12 may be further arranged to control the operation of the pneumatic arrangement.

According to embodiments of the present invention, the actuating mechanism may be provided with at least one motor 5 and 9, such as a direct drive or geared DC brushless motor, or any other suitable type of motor arrangement known to the skilled person in the art. The at least one motor 5 and 9 may be arranged for angularly displacing the first and/or second rotatable plate 2 and 3 about their respective rotation axis. For example, each plate may be provided with a respective motor 5 and 9 positioned at a desired location on each rotatable plate 2 and 3. Each motor 5 and 9 being arranged for angularly displacing the respective rotatable plate 2 and 3 around their respective rotation axis 20 and 21, thereby allowing for the position of the object 13 to be altered with respect to the main axis of rotation 19. Each rotatable plate 2 and 3 may be provided with a rotary encoder 4 and 10, which is arranged for detecting the angle of rotation of each respective rotatable plate. The rotary encoders 4 and 10 may be arranged for monitoring the angular displacement of the first rotatable plate 2 and/or second rotatable plate 3 and generate a corresponding analogue or digital output signal indicating the current angle of rotation of the first and/or second rotatable plate 2 and 3 around their respective rotation axis 20 and 21. The rotary encoder may be of any suitable digital or analog type such as an absolute rotary encoder, incremental encoder, resolver and the like. The actuating mechanism may comprise a controller 12 arranged for controlling the angular displacement of the first rotatable plate 2 and/or the second rotatable plate 3. For example the controller 12 may be arranged for controlling the angular displacement of the first and/or second rotatable plate 2 and 3 by providing to the motors 5 and 9 a set of relevant control signals corresponding to a desired angular displacement of the rotatable plates 2 and 3 around their respective rotation axis 20 and 21. The controller 12 may be arranged for controlling the angular displacement of the first and/or second rotatable plates 2 and 3 according to a set of instructions stored in the memory (EPROM or EEPROM or the like) of the controller or received from a computer device. For example, the computer device may be provided with a computer program product, such as a hard disk drive, a USB stick, a CD and the like, arranged for storing instruction for operating the actuator mechanism of the chuck thereby electronically controlling the angular displacement of the first and/or second rotatable plate 2 and 3.

According to embodiments of the present invention, the mounting interface plate 15 may be provided with a slip-ring 16 arranged for cooperating with a corresponding electrically conducting surface of the chuck so that electrical power may be transmitted from the static part of the ultra precision lathe to the chuck for operating the various electronic parts while rotating. The corresponding electrically conducting surface may comprise a set of brushes, which may be arranged for being retracted during critical machining operations by means of an actuator. As a result, perturbations in the rotating motion of the spindle 14 caused by the friction or pressure of the brushes 16 against the slip-ring may be avoided. Alternatively the electrical power may be supplied to the chuck by means of induction coils or may be provided from batteries installed on the chuck or the mounting interface.

Figure 3:
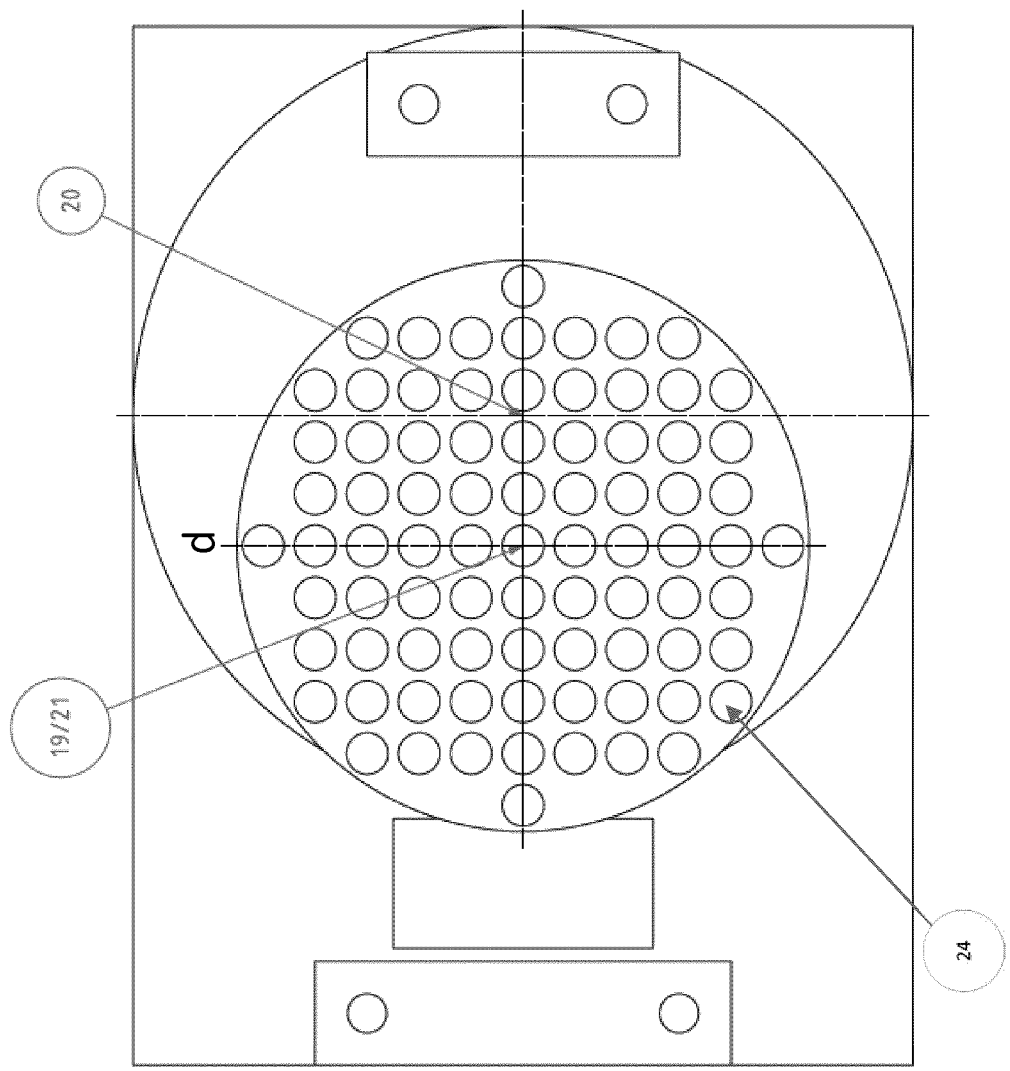
FIGS. 3 and 4 show schematically examples of changing the position of the object by angularly displacing the first and/or second rotatable plates.
Figure 4:
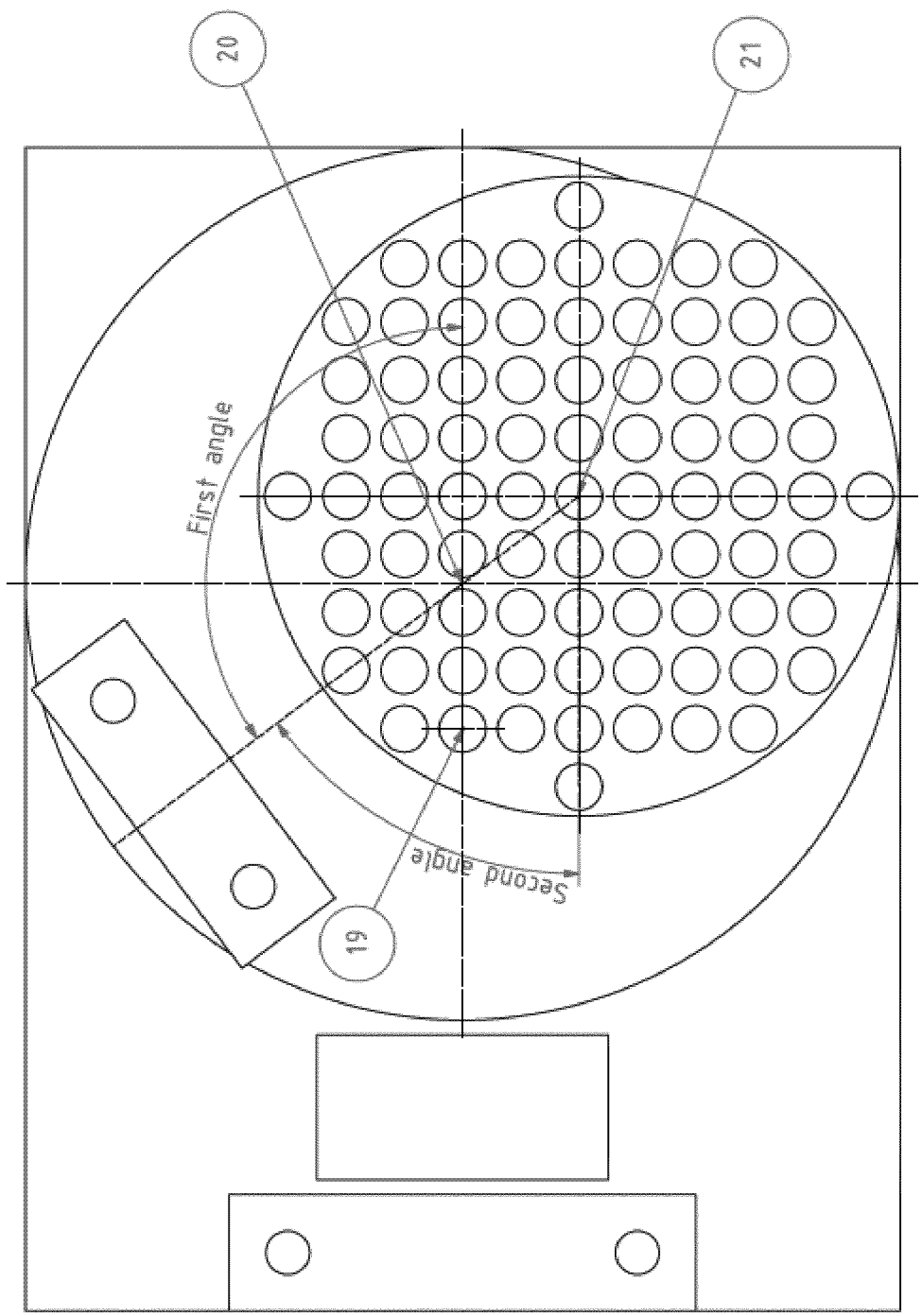

The chuck according to embodiments of the present invention is arranged for positioning an object, such as a work-piece, at various locations with respect to the main axis 19 of rotation without the need for rebalancing the chuck on the main rotating axis 19 each time the object is shifted to a new position. This is achieved by eccentrically mounting the first and second rotatable plates 2 and 3 so that the position of the object 13 with respect to the main axis may be altered. The necessary rotation angles of the first and second rotatable plates, given a desired cartesian coordinate of a point on the work-piece to align with the rotation axis 19, may be calculated using the following equations or any equivalent transformation:

$$\alpha = \arctan\left(\frac{2e^2\sqrt{1-\left(\frac{x^2+y^2}{2e^2}\right)}}{x^2+y^2}\right)$$

$$\beta = -\arccos\left(1 - \frac{x^2+y^2}{2e^2}\right)$$

$$\gamma = \alpha + \beta$$

where:

e is the eccentricity between the rotation axis B, which is the second rotation axis 21, and the rotation axis A, which is the first rotation axis 20 alpha ($\alpha$) is the angle of the rotation axis A (preferably 0 to 360°)

beta ($\beta$) is the angle of the rotation axis B (preferably 0 to 180°)

gamma ($\gamma$) is the induced rotation angle further it is assumed that the axis A substantially coincides, or even coincides, with the main axis of rotation 19 for one position of the first rotatable plate. Using the equations above the object 13 can be moved at different locations with respect to the main axis. This is shown schematically on FIGS. 3 and 4. Although any position can be reached using the above mentioned angular ranges for the angles of alpha (preferably 0 to 360°) and beta (preferably 0 to 180°), these angles may be also continuous over 360°. In FIG. 3, the object is positioned, by angularly displacing the first and/or second rotatable plates 2 and 3, such that the main axis 19 substantially coincides, or even coincides, with the second rotation axis 21. At the location of the main rotating axis 19, with the use of a cutting tool, a cavity 24 may be formed. In FIG. 4, the first rotatable plate 2 is rotated around a first angle of rotation, while the second rotatable plate 3 is rotated around a second angle of rotation so that the new object 13 is positioned at a new location with respect to the main axis of rotation 19, at which location and with the use of a cutting tool a new cavity 24 may be formed. By continuously rotating the first and/or second rotatable plates 2 and 3 around a respective angle of rotation the object can be shifted to a new position with respect to the main axis of rotation 19, at which position a new cavity 24 may be formed. Furthermore, by being able to precisely position the object with respect to the main axis, high precision methods, such a diamond turning can be used.

According to embodiments of the present invention, the second rotatable plate 3 is positioned on the first rotatable plate 2 such that the eccentricity of the two rotatable plates, which is defined as the distance between the first and the second rotating axes 20 and 21 and the distance between the first rotation axis 20 and the main rotation axis 19, is within a predetermined range. For example, the eccentricity may be arranged to be four times shorter than the maximum pitch or centre-to-centre distance (d) between two cavities on a work-piece when for at least one angle of rotation of the first rotatable plate 2 the second rotation axis 21 is arranged for substantially coinciding with the main axis of rotation 19.

According to embodiments of the present invention, a machine tool for turning and/or grinding a work-piece may be provided. The machine tool may be arranged for forming at least one cavity 24 or an array of cavities 24 on the surface of the work-piece. For example, the at least one cavity may be a mould cavity for the production of lenses. The machine tool may comprise a chuck according to embodiments of the present invention, which may be arranged for positioning the work-piece at a relevant position with respect to the main axis of rotation 19 of the machine spindle, so that machining operations can be performed on the work-piece surface. Using the work-piece manufactured by the machine tool according to embodiments of the present invention, a replication piece may be formed, which may be used for producing moulding products such as lenses. The lens produced either from the work-piece or the replication piece may be subsequently used in a lens arrangement such as the ones provided on mobile phones, cameras, telescopes, microscopes, and the like.

LIST OF REFERENCE NUMBERS

1 Base Plate
2 First rotatable plate
3 Second rotatable plate
4 Second encoder
5 Second motor 6 First counterweight
7 First roller bearing
8 Second roller bearing
9 First motor
10 First encoder
11 Second Counterweight
12 Controller
13 Object/work-piece
14 Spindle
15 Mounting interface plate
16 Slip-Ring
17 First holding mechanism
18 Second holding mechanism
19 Main rotating axis
20 First rotation axis
21 Second rotation axis
22 First flexure spring
23 Second flexure spring
24 cavity
25 Air channel
26 Pneumatic connection

The invention claimed is:

1. A chuck for a machine tool having a rotation spindle with a main axis of rotation, the chuck being arranged for positioning an object, at a relevant position with respect to the main axis of rotation, the chuck being arranged such that the chuck together with the object positioned on it has a principal axis of inertia that can be arranged to coincide with the main axis of rotation, the chuck comprising:
   a base plate comprising mounting means for mounting the chuck to the spindle;
   a first rotatable plate eccentrically mounted on the base plate with respect to the main axis of rotation and having a first rotation axis running in parallel to the main axis of rotation such that the first rotational axis is shifted with respect to the main axis of rotation of the spindle;
   balancing means arranged for balancing the centre of gravity of the chuck together with the object positioned on it with respect to the main axis of rotation such that the principal axis of inertia of the chuck together with the object substantially coincides with the main axis of rotation of the spindle;
   a holding mechanism arranged for securing the first rotatable plate to the base plate; and
   an actuating mechanism arranged for angularly displacing the first rotatable plate around the first rotation axis over a first angle of rotation such the position of the object with respect to the main axis of rotation can be altered;
   wherein the chuck comprises a second rotatable plate arranged for receiving the object, the second rotatable plate being eccentrically mounted on the first rotatable plate with respect to the first rotational axis and having a second rotation axis running in parallel to the main axis of rotation and the first axis of rotation such that the second rotation axis is shifted with respect to the first rotation axis, and being secured on the first plate by means of the holding mechanism;
   and wherein the actuating mechanism is arranged for angularly displacing the second rotatable plate around the second rotation axis over a second angle of rotation such that the position of the object with respect to the main axis of rotation can be altered.

2. A chuck according to claim 1, wherein for at least one angle of rotation of the first rotatable plate the second rotation axis is arranged for substantially coinciding with the main axis of rotation.

3. A chuck according to claim 1, wherein the holding mechanism is arranged for generating a holding force.

4. A chuck according to claim 3, wherein the holding mechanism comprises a magnet arrangement.

5. A chuck according to claim 1, wherein the balancing means comprises a counterweight arrangement, wherein the counterweight arrangement is adjustable, wherein the counterweight arrangement comprises a first part and a second part and wherein the first part of the counterweight arrangement is arranged for being positioned at a first location on the base plate and the second part of the counterweight arrangement is arranged for being positioned at a second location on the first rotatable plate with respect to the location of the first counterweight part.

6. A chuck according to claim 1, wherein the chuck comprises a pneumatic arrangement,
   wherein the pneumatic arrangement is arranged for generating a suction force for securing the object on the second rotatable plate,
   wherein the pneumatic arrangement is arranged for generating a lifting force that exceeds the holding force generated by the holding mechanism such that the first rotatable plate is lifted about the first rotation axis with respect to the base plate and,
   wherein the pneumatic arrangement is arranged for generating a lifting force that exceeds the holding force generated by the holding mechanism such that the second rotatable plate is lifted about the second rotation axis with respect to the first rotatable plate.

7. A chuck according to claim 1, wherein the actuating mechanism comprises at least one rotary encoder arranged for monitoring the angular displacement of the first rotatable plate and/or second rotatable plate,
   wherein the actuating mechanism comprises at least one motor arranged for angularly displacing the first and/or second rotatable plates and,
   wherein the actuating mechanism comprises a controller arranged for controlling the at least one motor.

8. A machine tool for turning and/or grinding a work piece so as to form at least one cavity on the surface of the work piece, the machine tool comprising a chuck according to claim 1.

9. A work piece formed by a machine tool according to claim 8.

10. A lens formed in a work piece according to claim 9 or a replication piece manufactured from the work piece, the work piece comprising at least one cavity, the at least one cavity being a mould.

11. A method of using a machine tool comprising a chuck according to claim 1 for positioning the object, at a relevant position with respect to the main axis of rotation.

12. The method according to claim 11 for turning or grinding a work piece.

13. The method according to claim 11, wherein in a further step at least one lens mould cavity is formed on the surface of the work piece, wherein in a further step at least one array of lens mould cavities is formed on the surface of the work piece.

14. The method according to claim 11, wherein in a further step a replication piece is created from the work piece.

15. The method according to claim 11, wherein in a further step at least one lens is created.

16. The method according to claim 15, wherein in a further step the lens is mounted in a lens arrangement.

17. A chuck for a machine tool having a rotation spindle with a main axis of rotation, the chuck being arranged for positioning an object, at a relevant position with respect to the main axis of rotation, the chuck being arranged such that the chuck together with the object positioned on it has a principal axis of inertia that can be arranged to coincide with the main axis of rotation, the chuck comprising:

- a base plate comprising mounting means for mounting the chuck to the spindle;
- a first rotatable plate eccentrically mounted on the base plate with respect to the main axis of rotation and having a first rotation axis running in parallel to the main axis of rotation such that the first rotational axis is shifted with respect to the main axis of rotation of the spindle;
- a counterweight arrangement for balancing the centre of gravity of the chuck together with the object positioned on it with respect to the main axis of rotation such that the principal axis of inertia of the chuck together with the object substantially coincides with the main axis of rotation of the spindle;
- a holding mechanism arranged for securing the first rotatable plate to the base plate; and
- a motor arranged for angularly displacing the first rotatable plate around the first rotation axis over a first angle of rotation such the position of the object with respect to the main axis of rotation can be altered;

wherein the chuck comprises a second rotatable plate arranged for receiving the object, the second rotatable plate being eccentrically mounted on the first rotatable plate with respect to the first rotational axis and having a second rotation axis running in parallel to the main axis of rotation and the first axis of rotation such that the second rotation axis is shifted with respect to the first rotation axis, and being secured on the first plate by means of the holding mechanism;

and wherein the motor is arranged for angularly displacing the second rotatable plate around the second rotation axis over a second angle of rotation such that the position of the object with respect to the main axis of rotation can be altered.

* * * * *